Patented Mar. 18, 1947

2,417,679

UNITED STATES PATENT OFFICE 2,417,679

REACTION PRODUCTS OF AN ALDEHYDE AND A TRIAZINE DERIVATIVE

Gaetano F. D'Alelio, Northampton, Mass., assignor to General Electric Company, a corporation of New York No Drawing. Application January 20, 1944, Serial No. 518,994

19 Claims. (Cl. 260—42)

This invention relates to the production of new synthetic materials and more particularly to new reaction products of especial value in the plastics and coating arts. Specifically the invention is concerned with compositions of matter comprising a reaction product of ingredients comprising an aldehyde, including polymeric aldehydes, hydroxyaldehydes and aldehyde-addition products, e. g., formaldehyde, glyceraldehyde, paraformaldehyde, dimethylol urea, mono- and poly-methylol melamines, etc., and a compound corresponding to the following general formula:

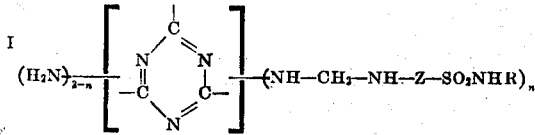

In the above formula $n$ represents an integer which is at least 1 but not more than 3, Z represents a divalent aromatic radical, more particularly a member of the class consisting of divalent aromatic, including nuclearly substituted, specifically nuclearly halogenated, aromatic hydrocarbon radicals, and R represents a member of the class consisting of hydrogen and monovalent hydrocarbon radicals. From the above formula it will be noted that when $n$ is 3 there will be no —NH₂ groups attached to the triazine nucleus.

Illustrative examples of divalent radicals that Z in the above formula may represent are divalent aromatic, e. g., phenylene, xenylene, naphthylene, etc.; divalent aliphatic-substituted aromatic, e. g., 2,4-tolylene, ethyl 2,5-phenylene, allyl 2,5-phenylene, isopropyl 3,4-phenylene, 1-butyl 2,4-naphthylene; and their homologues, as well as those divalent aromatic radicals with one or more of the hydrogen atoms of the aromatic nucleus replaced by substituents other than hydrocarbon radicals, e. g., acyl, hydroxy, alkoxy, aryloxy, carbalkoxy, amino, halogeno, an —SO₂NHR grouping in addition to the single —SO₂NHR grouping shown in the above formula, etc. Specific examples of substituted divalent radicals that Z may represent are: chlorophenylene, bromophenylene, chloroxenylene, chloronaphthylene, chlorotolylene, bromotolylene, ethoxyphenylene, acetophenylene, carbomethoxyphenylene, acetoxyphenylene, aminophenylene, hydroxyphenylene, phenoxyphenylene, methylphenylene (tolylene), allylphenylene, etc. Preferably Z is phenylene or tolylene.

Illustrative examples of monovalent hydrocarbon radicals that R in the above formula may represent are: aliphatic (e. g., methyl, ethyl, propyl, butyl, isobutyl, sec.-butyl, butenyl, pentyl, isopentyl, hexyl, octyl, allyl, methallyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, allylphenyl, 2-butenylphenyl, propylphenyl, isopropylphenyl, etc.); and aryl-substituted aliphatic (e. g., benzyl, phenylethyl, phenylpropyl, cinnamyl, etc.). Preferably R represents hydrogen.

Instead of the sulfamylarylaminomethyl melamines, which also may be named sulfamylarylaminomethylamino symmetrical triazines (s-triazines), represented by the above formula, corresponding derivatives of the asymmetrical triazines or of the vicinal triazines may be used.

The triazine derivatives used in carrying the present invention into effect are prepared, for example, by effecting reaction between a mono-, di- or tri-methylol melamine and an aminoaryl sulfonamide. The following example illustrates the preparation of 2,4,6-tri-(parasulfamylphenylaminomethyl) melamine:

Example 1

A suspension of 216 parts of symmetrical trimethylol melamine in 10,000 parts of water was mixed with a suspension of 516 parts of sulfanilamide (para-aminobenzene sulfonamide) in 10,000 parts of ethyl alcohol. Reaction was effected by vigorously stirring the mixture for 112 hours at a temperature of about 20° to 30° C. The resulting precipitate comprising 2,4,6-tri-(para - sulfamylphenylaminomethyl) melamine was filtered off, washed, and dried in air at room temperature. The purified material was used as a reactant with an aldehyde as described in the examples hereinafter given.

Illustrative examples of triazine derivatives embraced by Formula I that may be used in practicing the present invention are listed below:

Para - sulfamylphenylaminomethyl melamine, which also may be named para-sulfamylphenylaminomethylamino diamino s-triazine.

Di-(para-sulfamylphenylaminomethyl) melamine, which also may be named di-(para-sulfamylphenylaminomethylamino) amino s-triazine.

The mono-, di- and tri-(ortho-sulfamylphenylaminomethyl) melamines.

The mono-, di- and tri-(meta-sulfamylphenylaminomethyl) melamines.

The mono-, di- and tri-[para-(phenylsulfamyl)-phenylaminomethyl] melamines.

The mono-, di- and tri-[para-(methylsulfamyl)-phenylaminomethyl] melamines.

The mono-, di- and tri-[ortho-(ethylsulfamyl)-phenylaminomethyl] melamines.

The mono-, di- and tri-(sulfamylnaphthylaminomethyl) melamines.

The mono-, di- and tri-(sulfamyltolylaminomethyl) melamines.

The mono-, di- and tri-[sulfamyl-(dimethyl)-phenylaminomethyl] melamines.

The mono-, di- and tri-[sulfamyl-(ethyl)-phenylaminomethyl] melamines.

The mono-, di- and tri-[sulfamyl-(propyl)-phenylaminomethyl] melamines.

The mono-, di- and tri-(methylsulfamylnaphthylaminomethyl) melamines.

The mono-, di- and tri-(cyclohexylsulfamyltolylaminomethyl) melamines.

The mono-, di- and tri-(chlorophenylsulfamylphenylaminomethyl) melamines.

The mono-, di- and tri-[sulfamyl-(chloro)-phenylaminomethyl] melamines.

The mono-, di- and tri-[sulfamyl-(methoxy)-phenylaminomethyl] melamines.

The present invention is based on my discovery that new and valuable materials of particular utility in the plastics and coating arts can be produced by effecting reaction between ingredients comprising an aldehyde, including polymeric aldehydes, hydroxyaldehydes and aldehyde-addition products, and a triazine derivative of the kind embraced by Formula I, numerous examples of which have been given above. The resinous condensation products of the present invention have excellent resistance to heat and water. Furthermore, the sulfamylarylaminomethylamino grouping of the triazine derivative imparts improved plastic flow to condensation products of an aldehyde and the triazine derivative. This was quite surprising and unexpected, and in no way could have been predicted. Because of the excellent plastic flow of the thermosetting resins of this invention during curing, they are suitable for molding and other applications for which resinous materials and molding compositions of lesser plasticity during curing would be entirely unsuited.

In practicing my invention the initial reaction between the components may be carried out at normal or at elevated temperatures, at atmospheric, sub-atmospheric or super-atmospheric pressures and under neutral, alkaline or acid conditions. Preferably the reaction between the components is initiated under alkaline conditions.

Any substance yielding an alkaline or an acid aqueous solution may be used in obtaining alkaline or acid conditons for the initial condensation reaction. Examples of such substances that suitably may be employed are given in my Patent No. 2,312,697 on page 2, column 2, lines 39-70.

The reaction between the aldehyde, e. g., formaldehyde, and the sulfamylarylaminomethylamino s-triazine may be effected in the presence or absence of solvents or diluents, fillers, other natural or synthetic resinous bodies, or while admixed with other materials that also can react with the aldehydic reactant or with the triazine derivative, e. g., urea, thiourea, melamine, ammeline, phenol, cresol, butyl alcohol, etc. Other examples of modifying bodies that may be employed are given in my Patent No. 2,312,697 on page 3, column 1, lines 3-33, page 6, column 1, lines 65-75, column 2, lines 1-30, and in the applications referred to therein.

The modifying reactants may be incorporated with the triazine derivative and the aldehyde by mixing all the reactants and effecting reaction therebetween or by various permutations of reactants as described, for example, in my Patent No. 2,322,566 on page 2, column 2, lines 23-41, with particular reference to reactions involving a urea, an aldehyde and oxanilic acid. For instance, I may form a partial condensation product of ingredients comprising (1) urea or melamine or urea and melamine (2) a sulfamylarylaminomethylamino s-triazine, e. g., mono-(sulfamylarylaminomethylamino) diamino s-triazine, di-(sulfamylarylaminomethylamino) amino s-triazine, tri-(sulfamylarylaminomethylamino) s-triazine, and (3) an aldehyde, including polymeric aldehydes, hydroxy-aldehydes and aldehyde-addition products, e. g., formaldehyde, glyceraldehyde, dimethylol urea, trimethylol melamine, etc. Thereafter I may effect reaction between this partial condensation (intercondensation) product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert rapidly under heat or under heat and pressure, due to the numerous reactive positions in the molecule of the triazine derivative, to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, curing agents, etc., may be used, for example, in the production of molding compositions.

The heat-curable resinous condensation products of this invention show excellent flow characteristics during a short curing cycle. This is a property that is particularly desirable in a molding compound. The molded articles have a glossy surface finish and show excellent resistance to arcing. By suitable choice of the starting reactants and the conditions of reaction, resinous materials are produced that, when made into molding compositions and molded, yield light-colored, light-resistant molded articles. The liquid intermediate condensation products may be concentrated or diluted further by the removal or addition of volatile solvents to form liquid coating compositions of adjusted viscosity and concentration. The heat-convertible or potentially heat-convertible condensation products may be used in liquid state, for instance, as surface-coating materials, in the production of paints, varnishes, lacquers, enamels, etc., for general adhesive applications, in producing laminated wood veener and other laminated articles, and for numerous other purposes. The liquid heat-hardenable or potentially heat-hardenable condensation products also may be used directly as casting resins, while those which are of a gel-like nature in partially condensed state may be dried and granulated to form clear, unfilled, heat-convertible resins.

In order that those skilled in the art better may understand how this invention may be carried into effect, the following examples are given by way of illustration and not by way of limitation. All parts are by weight.

Example 2

| | Parts |
|---|---|
| Tri - (para - sulfamylphenylaminomethyl)-melamine, which also may be named tri-(para - sulfamylphenylaminomethylamino) s-triazine or 2,4,6-tri-(para-sulfamylphenylaminomethylamino) 1, 3, 5 - triazine | 67.8 |
| Aqueous formaldehyde (approx. 37.1% HCHO) | 243.0 |
| Sodium hydroxide in 5 parts water | 0.1 |
| Chloroacetamide (monochloroacetamide) | 2.0 |

All of the above ingredients with the exception of the chloroacetamide were heated together under reflux at the boiling temperature of the mass for 30 minutes, yielding a clear, resinous syrup. This syrup was potentially heat-curable as shown by the fact that when samples were treated with a small amount of various curing agents, followed by heating on a 140° C. hot plate, the modified syrup cured to an insoluble, infusible state. The above-stated amount of chloroacetamide was added to the syrupy condensation product and heating under reflux was continued for an additional 10 minutes to cause the chloroacetamide to intercondense with the substituted melamine-formaldehyde partial condensation product. A molding (moldable) compound was made from the resulting syrup by mixing therewith 70 parts alpha cellulose in flock form and 0.4 part of a mold lubricant, specifically zinc stearate. A sample of the dried and ground molding compound was molded for 8 minutes at 130° C. under a pressure of 2,000 pounds per square inch. A well-cured, translucent molded piece having good water resistance was obtained. The molding composition showed excellent flow characteristics during molding.

Instead of using chloroacetamide as above described in accelerating the curing of the potentially reactive resinous material, heat-convertible compositions may be produced by adding to the syrup direct or active curing catalysts (e. g., citric acid, phthalic anhydride, malonic acid, oxalic acid, etc.), or latent curing catalysts (e. g., sodium chloroacetate, glycine ethyl ester hydrochloride, etc.), or by intercondensation with curing reactants other than monochloroacetamide (e. g., di- and tri-chloroacetamides, chloroacetonitriles, alpha, beta-dichloropropionamide, alpha, beta-dibromopropionitrile, aminoacetamide hydrochloride, aminoacetonitrile hydrochloride, ethylene diamine monohydrochloride, diethanolamine hydrochloride, nitrourea, chloroacetyl urea, chloroacetone, glycine, sulfamic acid, citric diamide, phenacyl chloride, etc.).

Example 3

| | Parts |
|---|---|
| Tri - (para - sulfamylphenylaminomethyl) melamine | 67.8 |
| Urea | 54.0 |
| Aqueous formaldehyde (approx. 37.1% HCHO) | 324.0 |
| Sodium hydroxide in 10 parts water | 0.2 | were heated together under reflux at the boiling temperature of the mass for 30 minutes, yielding a clear syrup having a pH of 6.62. When a small amount of citric acid, nitrourea, chloroacetamide, chloral urea or other curing agent such as mentioned under Example 2 was added to samples of this syrup, the individual sample cured to a hard, infusible resin upon heating on a 140° C. hot plate.

One (1) part of chloroacetamide was added to 230 parts of the syrupy condensation product, and the resulting mixture was heated under reflux at boiling temperature for 10 minutes. Seventy (70) parts alpha cellulose and 0.4 part zinc stearate were mixed with the resulting syrup to form a molding compound, which thereafter was dried at 70° C. for 3¼ hours. A well-cured molded article, which exhibited good plastic flow during molding, was obtained by molding a sample of the dried and ground molding composition for 5 minutes at 130° C. under a pressure of 2,000 pounds per square inch. The molded piece had a glossy surface appearance and showed good resistance to water.

Example 4

| | Parts |
|---|---|
| Tri - (para - sulfamylphenylaminomethyl) melamine | 33.9 |
| Melamine | 56.7 |
| Aqueous formaldehyde (approx. 37.1% HCHO) | 324.0 |
| Sodium hydroxide in 5 parts water | 0.1 |
| Chloroacetamide | 1.0 |

All of the above ingredients with the exception of the chloroacetamide were heated together under reflux at the boiling temperature of the mass for 30 minutes, yielding a clear syrup that cured to a hard resin when a small sample of the syrup was heated on a 140° C. hot plate. The curing of the syrup is accelerated by incorporating therein chloroacetamide, glycine, citric acid, sulfamic acid or other curing agent such as mentioned under Example 2.

The above-stated amount of chloroacetamide was added to the syrupy condensation product, and heating under reflux at boiling temperature was continued for an additional 10 minutes. A molding composition was produced from the resulting syrup as described under Example 3. Molded articles produced from samples of the dried and ground molding compound by molding under heat and pressure as set forth under Example 3 were well cured and had good resistance to water.

Example 5

| | Parts |
|---|---|
| Tri-(para-sulfamylphenylaminomethyl) melamine | 67.8 |
| Furfural | 57.6 |
| Sodium hydroxide in 5 parts water | 0.1 |
| Water | 200.0 | were heated together under reflux at the boiling temperature of the mass for 15 minutes, yielding a very viscous, water-insoluble resin. When a sample of this resin was heated on a 140° C. hot plate, it cured to an infusible state in the absence of a curing agent. The addition of a small amount of chloroacetamide, glycine, citric acid or other curing agent such as mentioned under Example 2 accelerated the conversion of the resin to a cured state. The cured resin was insoluble in ethyl alcohol. The resinous composition of this example would be suitable for use in the production of molding compositions.

Example 6

| | Parts |
|---|---|
| Tri-(para-sulfamylphenylaminomethyl) melamine | 67.8 |
| Acrolein | 33.6 |
| Sodium hydroxide in 5 parts water | 0.1 |
| Water | 200.0 | were heated together under reflux at the boiling temperature of the mass for 10 minutes, yielding a resinous syrup that cured to an insoluble, infusible state when a small sample of it was heated on a 140° C. hot plate. When a small amount of citric acid, glycine or other curing agent such as mentioned under Example 2 was incorporated into the syrupy resin, the resin cured more rapidly upon heating on a 140° C. hot plate. The resinous material of this example may be used in the production of molding compounds or as a modifier of other resins.

Example 7

| | Parts |
|---|---|
| Tri-(para-sulfamylphenylaminomethyl) melamine | 67.8 |
| Butyl alcohol | 37.0 |
| Aqueous formaldehyde (approx. 37.1% HCHO) | 146.8 |
| Sodium hydroxide in 5 parts water | 0.1 |

All of the above ingredients were heated together under reflux at boiling temperature for 15 minutes. The resulting syrup was clear and, upon dehydration, yielded a transparent, very viscous resin, which was soluble in benzene but insoluble in water and in ethyl alcohol. The dehydrated resin cured to a hard, infusible film, in the absence of a curing agent, when a small sample was heated at 140° C. The addition of a small amount of a curing agent such as mentioned under Example 2 accelerated the cure of the resin when it was heated on a 140° C. hot plate. The resinous material of this example is especially suitable for use in the preparation of liquid coating compositions.

Example 8

| | Parts |
|---|---|
| Tri-(para-sulfamylphenylaminomethyl) melamine | 67.8 |
| Acetamide | 5.9 |
| Aqueous formaldehyde (approx. 37.1% HCHO) | 146.8 |
| Sodium hydroxide in 5 parts water | 0.1 | were heated together under reflux at boiling temperature for 5 minutes, yielding a very viscous syrup. This syrup cured to a tough, flexible film when a sample of it was heated on a 140° C. hot plate. The addition of chloroacetamide, nitrourea, citric acid or other curing agent such as mentioned under Example 2 accelerated the cure of the resin at 140° C., and the resin became harder and less flexible. The resinous composition of this example may be used in the production of coating materials or as a modifier of other synthetic resins.

Example 9

| | Parts |
|---|---|
| Tri-(para-sulfamylphenylaminomethyl) melamine | 67.8 |
| Diethyl malonate | 16.0 |
| Aqueous formaldehyde (approx. 37.1% HCHO) | 146.8 |
| Sodium hydroxide in 5 parts water | 0.1 | were heated together as described under Example 8. The resulting syrup cured to a tough, hard resin, without the addition of a curing agent, when a small sample was heated at 140° C. More rapidly curing compositions were obtained by incorporating into the syrupy condensation product a small amount of chloroacetamide or other curing agent such as mentioned under Example 2.

Example 10

| | Parts |
|---|---|
| Tri-(para-sulfamylphenylaminomethyl) melamine | 67.8 |
| Glycerine | 9.2 |
| Aqueous formaldehyde (approx. 37.1% HCHO) | 146.8 |
| Sodium hydroxide in 5 parts water | 0.1 | were heated together under reflux at the boiling temperature of the mass for 15 minutes. The resulting syrup gelled on cooling to room temperature. A small sample of the hot syrup, when placed on a 140° C. hot plate, was converted at this temperature to a tough resin. The addition of chloroacetamide, sulfamic acid or other curing agent such as mentioned under Example 2 to small samples of the syrupy condensation product, followed by heating on a 140° C. hot plate, accelerated the cure of the resin to an insoluble, infusible state. The resinous material of this example may be used as a plasticizer of less plastic resins to improve their plasticity or flow characteristics. It also may be used in the production of coating materials.

Example 11

| | Parts |
|---|---|
| Tri-(para-sulfamylphenylaminomethyl) melamine | 67.8 |
| Polyvinyl alcohol | 26.4 |
| Aqueous formaldehyde (approx. 37.1% HCHO) | 146.8 |
| Sodium hydroxide in 5 parts water | 0.1 |

All of the above ingredients were heated together under reflux at boiling temperature for 5 minutes, yielding a very viscous syrup that bodied to a thermoplastic resin when a small sample of it was heated on a 140° C. hot plate. When the pH of the syrup was lowered by the addition of a small amount of dilute hydrochloric acid, the syrup was convertible at 140° C. to a hard, infusible resin. Films of the acidified resinous syrup were baked for 5 hours at 55° to 80° C. The resin became hard and had fair tensile strength even in film form. The resinous composition of this example may be used in the production of molding compounds or in the preparation of various liquid coating materials.

It will be understood, of course, by those skilled in the art that the reaction between the aldehyde and the triazine derivative may be effected at temperatures ranging, for example, from room temperature to the fusion or boiling temperature of the mixed reactants or of solutions of the mixed reactants, the reaction proceeding more slowly at normal temperature than at elevated temperatures in accordance with the general law of chemical reactions. Thus, instead of effecting reaction between the ingredients of the above examples under reflux at the boiling temperature of the mass as mentioned in the individual examples, the reaction between the components may be carried out at lower temperatures, for example at temperatures ranging from room temperature to a temperature near the boiling temperature, using longer reaction periods and, in some cases, stronger catalysts and higher catalyst concentrations.

It also will be understood by those skilled in the art that my invention is not limited to condensation products obtained by reaction of ingredients including an aldehyde and the specific triazine derivative named in the above illustrative examples. Thus, instead of tri-(para-sulfamylphenylaminomethyl) melamine, I may use, for example, tri-(ortho-sulfamylphenylaminomethyl) melamine, tri-(meta-sulfamylphenylaminomethyl) melamine, mixtures of the said ortho, meta and para derivatives, mono- or di-(ortho-, meta- or para-sulfamylphenylaminomethyl) melamine or mixtures thereof, or mixtures of either or both of the said mono- and di-substituted compounds with tri-(ortho-, meta- or para-sulfamylphenylaminomethyl) melamine or with mixtures thereof, or with any other triazine derivative (or mixtures thereof) of the kind embraced by Formula I, numerous examples of which have been given hereinbefore.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, heptaldehyde, octaldehyde, acrolein, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde or compounds engendering formaldehyde with such aldehydes. Instead of an aldehyde I may use, for instance, an aldehyde-addition product. For example, the aldehydes mentioned in the above illustrative examples may be replaced in whole or in part by an equivalent amount of, for instance, a methylol urea, specifically monomethylol urea or dimethylol urea, a methylol aminotriazine (e. g., a monomethylol aminotriazine such as monomethylol melamine or a polymethylol aminotriazine, specifically a polymethylol melamine such as di-, tri-, tetra-, penta- or hexa-methylol melamine), a methylol diazine, e. g., a trimethylol pyrimidine, a methylol guanazole, e. g., dimethylol guanazole, etc.

The ratio of the aldehydic reactant to the triazine derivative may be varied over a wide range, but these reactants ordinarily are employed in an amount corresponding to at least one mol of the aldehyde, specifically formaldehyde, for each mol of the triazine derivative. Thus, I may use, for example, from one to twelve or fifteen or more mols of an aldehyde for each mol of the triazine derivative. When the aldehyde is available for reaction in the form of an alkylol derivative, then higher amounts of such aldehyde-addition products are used, for instance from three or four up to twenty-five or thirty or more mols of such alkylol derivative for each mol of the triazine derivative.

As indicated hereinbefore and as further shown by a number of the examples, the properties of the fundamental resins of this invention may be varied widely by introducing other modifying bodies before, during or after effecting reaction at normal or at elevated temperatures between the primary components. Thus, as modifying agents I may use, for instance, monohydric alcohols, e. g., ethyl, propyl, butyl, isobutyl, hexyl, etc., alcohols; polyhydric alcohols, e. g., diethylene glycol, triethylene glycol, glycerine, pentaerythritol, etc.; phenol and substituted phenols, including aminophenols; and others such as mentioned, for example, in my Patent No. 2,312,697, page 6, column 1, lines 65-75, column 2, lines 1-30.

Dyes, pigments, plasticizers, mold lubricants, opacifiers and various fillers (e. g., wood flour, glass fibers, asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, wood veneer, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They may be employed for treating cotton, linen and other cellulosic materials in sheet or other form. They also may be used as impregnants for electrical coils, in the manufacture of electrical protective devices, e. g., in making arc-extinguishing tubes capable of evolving an arc-extinguishing gas under the heat of the arc as described, for instance, in Boyer Patent No. 2,157,815 with particular reference to structures comprising a polymer of the class exemplified by polymeric methyl methacrylate, and for other electrical and industrial applications.

What I claim as new and desire to secure by Letters Patent of the United States is:

1. A composition of matter comprising the product of reaction of ingredients including an aldehyde and a compound corresponding to the general formula

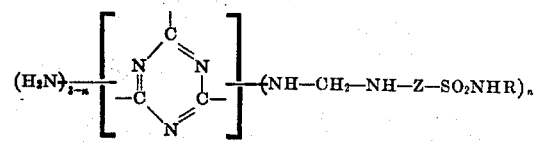

where $n$ represents an integer which is at least 1 but not more than 3, Z represents a member of the class consisting of divalent aromatic hydrocarbon radicals and divalent nuclearly halogenated aromatic hydrocarbon radicals, and R represents a member of the class consisting of hydrogen and monovalent hydrocarbon radicals.

2. A composition as in claim 1 wherein the aldehyde is formaldehyde.

3. A composition as in claim 1 wherein the reaction product is the product obtained by effecting initial reaction between the specified components under alkaline conditions.

4. A composition as in claim 1 wherein the reaction product is an alcohol-modified reaction product of the stated components.

5. A composition comprising the resinous product of reaction of ingredients including an aldehyde and a sulfamylarylaminomethyl melamine.

6. A heat-curable resinous composition comprising a heat-convertible condensation product of ingredients including formaldehyde and a sulfamylarylaminomethyl melamine.

7. A composition comprising a heat-cured condensation product of ingredients including formaldehyde and a sulfamylarylaminomethyl melamine.

8. A composition comprising the resinous product of reaction of ingredients including an aldehyde and a mono-(sulfamylphenylaminomethyl) melamine.

9. A composition comprising the resinous product of reaction of ingredients including an aldehyde and a di-(sulfamylphenylaminomethyl) melamine.

10. A composition comprising the resinous product of reaction of ingredients including an aldehyde and a tri-(sulfamylphenylaminomethyl) melamine.

11. A resinous composition comprising the product of reaction of ingredients comprising an aldehyde and tri-(para-sulfamylphenylaminomethyl) melamine.

12. A composition comprising the product of reaction of ingredients including a urea, an aldehyde and a compound corresponding to the general formula

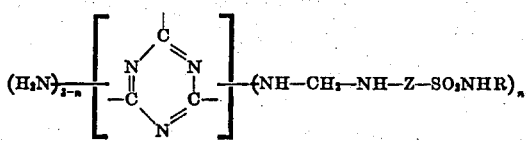

where $n$ represents an integer which is at least 1 but not more than 3, Z represents a member of the class consisting of divalent aromatic hydrocarbon radicals and divalent nuclearly halogenated aromatic hydrocarbon radicals, and R represents a member of the class consisting of hydrogen and monovalent hydrocarbon radicals.

13. A resinous composition comprising the product of reaction of ingredients including urea, formaldehyde and a sulfamylphenylaminomethyl melamine.

14. A composition comprising the product of reaction of ingredients including melamine, an aldehyde and a compound corresponding to the general formula

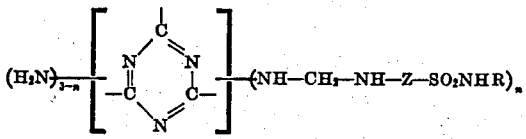

where $n$ represents an integer which is at least 1 but not more than 3, Z represents a member of the class consisting of divalent aromatic hydrocarbon radicals and divalent nuclearly halogenated aromatic hydrocarbon radicals, and R represents a member of the class consisting of hydrogen and monovalent hydrocarbon radicals.

15. A resinous composition comprising the product of reaction of ingredients including melamine, formaldehyde and a sulfamylphenylaminomethyl melamine.

16. A heat-curable composition comprising the heat-convertible resinous reaction product of (1) a partial condensation product of ingredients including formaldehyde and a sulfamylarylaminomethyl melamine and (2) a curing reactant.

17. A heat-curable composition comprising the heat-convertible resinous reaction product of (1) a partial condensation product of ingredients including urea, formaldehyde and a sulfamylphenylaminomethyl melamine and (2) a chlorinated acetamide.

18. A composition containing the resinous product of reaction of ingredients including dimethylol urea and a sulfamylarylaminomethyl melamine.

19. The method of preparing new synthetic materials which comprises effecting reaction between ingredients including an aldehyde and a compound corresponding to the general formula

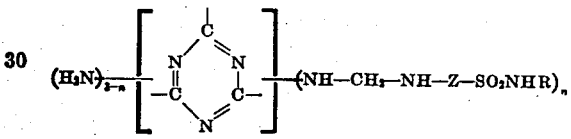

where $n$ represents an integer which is at least 1 but not more than 3, Z represents a member of the class consisting of divalent aromatic hydrocarbon radicals and divalent nuclearly halogenated aromatic hydrocarbon radicals, and R represents a member of the class consisting of hydrogen and monovalent hydrocarbon radicals.

GAETANO F. D'ALELIO.

REFERENCES CITED

The following references are of record in the file of this patent:

UNITED STATES PATENTS

| Number | Name | Date |
|---|---|---|
| 2,312,697 | D'Alelio | Mar. 2, 1943 |